(12) United States Patent
Tomlinson

(10) Patent No.: US 12,037,558 B1
(45) Date of Patent: Jul. 16, 2024

(54) NON-ABSORBENT BRIQUETTE FOR GAS GRILLS

(71) Applicant: Matthew A. Tomlinson, Parrish, FL (US)

(72) Inventor: Matthew A. Tomlinson, Parrish, FL (US)

( * ) Notice: Subject to any disclaimer, the term of this patent is extended or adjusted under 35 U.S.C. 154(b) by 0 days.

(21) Appl. No.: 18/139,399

(22) Filed: Apr. 26, 2023

(51) Int. Cl.
*C10L 5/36* (2006.01)

(52) U.S. Cl.
CPC ....... *C10L 5/361* (2013.01); *C10L 2200/0231* (2013.01); *C10L 2200/024* (2013.01)

(58) Field of Classification Search
CPC ............. C10L 5/361; C10L 2200/0231; C10L 2200/024
See application file for complete search history.

(56) References Cited

U.S. PATENT DOCUMENTS

| | | | |
|---|---|---|---|
| 2,353,688 A * | 7/1944 | Burgess | C22C 38/26 148/611 |
| 3,450,529 A | 6/1969 | MacDonald | |
| 3,540,922 A | 11/1970 | Brown et al. | |
| 4,058,052 A | 11/1977 | Hart | |
| 4,787,914 A | 11/1988 | Crace | |
| 6,273,922 B1 | 8/2001 | Funk et al. | |
| 11,339,340 B2 | 5/2022 | Fisher et al. | |
| 2011/0120977 A1 * | 5/2011 | Lai | B23K 35/3086 219/121.64 |

* cited by examiner

*Primary Examiner* — Cephia D Toomer
(74) *Attorney, Agent, or Firm* — Bryan L. Loeffler, Esq.; LOEFFLER IP GROUP. P.A.

(57) ABSTRACT

An improved briquette (1) for use in gas grills wherein the briquette provides a smooth non-absorbent outer surface (3) that allows grease and food drippings to flow over the briquette without becoming trapped in the surface of the briquette, thereby reducing the likelihood of rust forming inside the grill and prolonging the life of the grill.

9 Claims, 1 Drawing Sheet

US 12,037,558 B1

NON-ABSORBENT BRIQUETTE FOR GAS GRILLS

FIELD OF THE INVENTION

This invention relates to gas grills used for cooking and, more particularly, to a reusable briquette for use in gas grills wherein the briquette has a smooth non-absorbent surface.

BACKGROUND OF THE INVENTION

Gas-fired cooking grills are popular for home use and differ from traditional barbecue grills in that they rely upon a gas flame for heat, as opposed to the combustion of charcoal briquettes or the like. Conventional gas grills frequently utilize tubular burners having multiple combustion ports or orifices. The grills often employ an inert material, such as so-called "lava rocks" or ceramic tiles, to absorb drippings from food cooking on a grate positioned above the material and to radiate heat for providing a more even heat distribution.

However, lava rocks are porous, thereby causing them to soak up juices, grease, and other drippings making them nearly impossible to clean. This is also true for other conventional reusable briquettes, such as ceramic briquettes, which also have absorbent surfaces that collect and prevent dripping from flowing freely to a collection pan.

Therefore, a need exists for an improved reusable briquette for gas grill wherein the briquette has a smooth non-absorbent surface.

SUMMARY OF THE INVENTION

The primary object of the present invention is to provide an improved reusable briquette for use in gas grills wherein the briquette provides a smooth non-absorbent surface that allows grease and food dripping to flow over the briquettes without becoming trapped.

The present invention fulfills the above and other objects by providing an improved briquette having an outer surface formed from an alloy of iron, carbon and at least eleven percent (11%) chromium and five percent (5%) nickel wherein the alloy is designed to provide sufficient heat retention for cooking and a smooth nonporous surface that does absorb grease or other drippings. Molybendum may also be added to the alloy to further prevent pitting and corrosion on the surface of the briquette. A preferred density of the alloy mixture is preferably within a range of 7,500 kg/m³ to 8,000 kg/m³ to provide a desired heat retention and smooth surface density.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
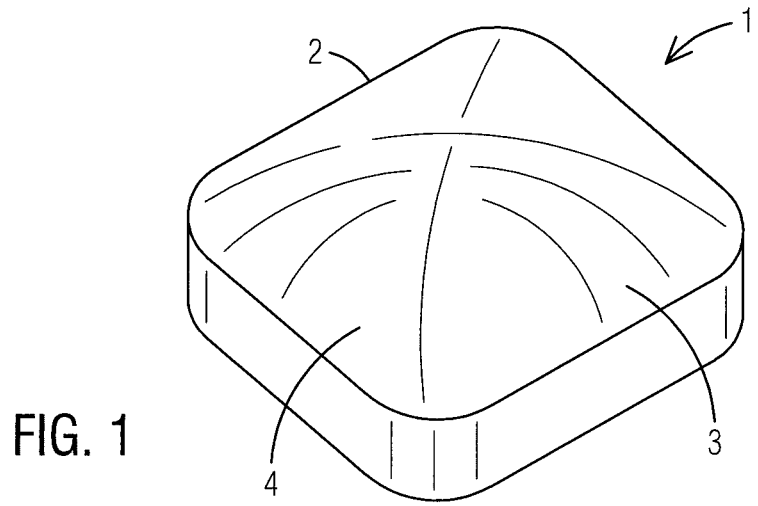
FIG. 1 is top perspective view of a briquette of the present invention.
Figure 2:
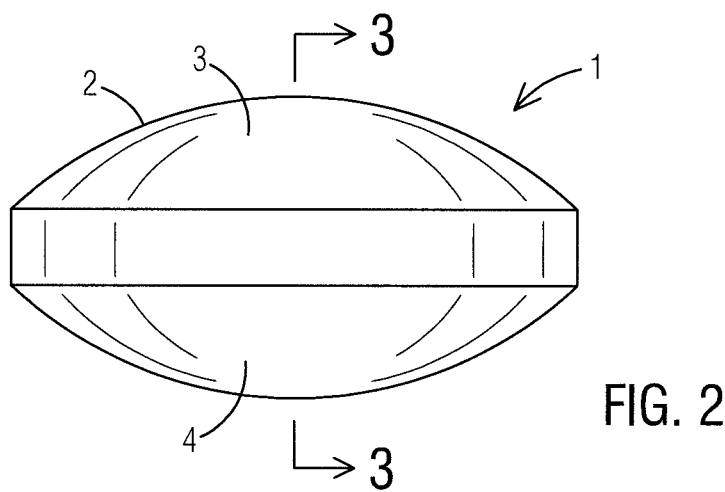
FIG. 2 is a side view of the briquette of the present invention.
Figure 3:
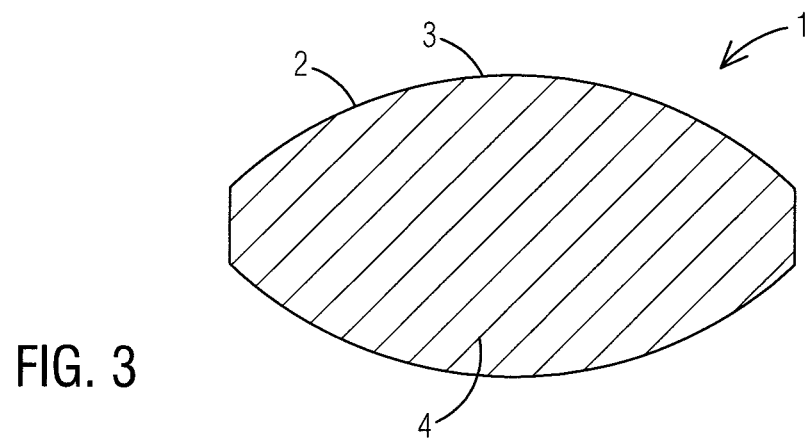
FIG. 3 is a side sectional view along lines 3-3 of FIG. 2.

For purposes of describing the preferred embodiment, the terminology used in reference to the numbered accessories in the drawings is as follows:
1. briquette, generally
2. body
3. outer surface
4. alloy mixture With Reference to FIGS. 1-3, an improved briquette 1 of the present invention is illustrated. The briquette preferably has a body 2 having an outer surface 3 constructed from an alloy mixture 4 of iron (Fe), carbon (C), at least eleven percent (11%) chromium (Cr), and at least five percent (5%) nickel (N) to provide a smooth nonporous surface that does not absorb grease. Molybendum may also be added to the alloy mixture 4 to further prevent pitting and corrosion on the alloy mixture 4 and the outer surface 3 of the briquette 1. A preferred density of the alloy mixture 4 is preferably within a range of 7,500 kg/m³ to 8,000 kg/m³ to provide a desired heat retention and smooth surface.

The entire body 2 of the briquette 1 may be formed from the alloy mixture 4 or just the outer surface 3 of the briquette 1 may be formed from the alloy mixture 3.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described my invention, I claim:

1. A briquette for use in a gas grill, said briquette comprising:
   a body having an outer surface wherein an upper surface of the body is rounded to allow grease and food drippings to flow over and off the briquette;
   wherein a lower surface of the body is rounded to further allow grease and food drippings to flow over and off of the briquette;
   said entire outer surface of said body is constructed from an alloy mixture of iron (Fe), carbon (C), and at least eleven percent (11%) chromium (Cr) wherein said alloy mixture provides a smooth non-absorbent nonporous outer surface on said body of the briquette.

2. The briquette of claim 1 wherein:
   said alloy mixture further comprises at least five percent (5%) nickel.

3. The briquette of claim 1 wherein:
   said alloy mixture further comprises Molybendum.

4. The briquette of claim 1 wherein:
   said alloy mixture having a density within a range of 7,500 kg/m3 to 8,000 kg/m3.

5. A briquette for use in a gas grill, said briquette comprising:
   a body having an outer surface wherein an upper surface of the body is rounded to allow grease and food drippings to flow over and off the briquette;
   wherein a lower surface of the body is rounded to further allow grease and food drippings to flow over and off of the briquette;
   said entire outer surface of said body is constructed from an alloy mixture of iron (Fe), carbon (C), at least eleven percent (11%) chromium (Cr), and at least five percent (5%) nickel wherein said alloy mixture provides a smooth non-absorbent nonporous outer surface on said body of the briquette.

6. The briquette of claim 5 wherein:

said alloy mixture further comprises Molybendum.

7. The briquette of claim 5 wherein:

said alloy mixture having a density within a range of 7,500 kg/m3 to 8,000 kg/m3.

8. A briquette for use in a gas grill, said briquette comprising:

a body having an outer surface wherein an upper surface of the body is rounded to allow grease and food drippings to flow over and off the briquette;

wherein a lower surface of the body is rounded to further allow grease and food drippings to flow over and off the briquette;

said entire outer surface of said body is constructed from an alloy mixture of iron (Fe), carbon (C), at least eleven percent (11%) chromium (Cr), and at least five percent (5%) nickel wherein said alloy mixture provides a smooth non-absorbent nonporous outer surface on said body of the briquette; and said alloy mixture having a density within a range of 7,500 kg/m3 to 8,000 kg/m3.

9. The briquette of claim 8 wherein:

said alloy mixture further comprises Molybendum.

* * * * *